US012709285B2

(12) United States Patent
Park et al.

(10) Patent No.: US 12,709,285 B2
(45) Date of Patent: Aug. 18, 2026

(54) STEERING APPARATUS FOR VEHICLE AND CONTROL METHOD THEREFOR

(71) Applicant: HYUNDAI MOBIS CO., LTD., Seoul (KR)

(72) Inventors: Hae Kwon Park, Yongin-si (KR); Byeung Su Kim, Yongin-si (KR); Jae Hong Jeon, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 79 days.

(21) Appl. No.: 18/790,008

(22) Filed: Jul. 31, 2024

(65) Prior Publication Data

US 2025/0065892 A1 Feb. 27, 2025

(30) Foreign Application Priority Data

Aug. 22, 2023 (KR) ........................ 10-2023-0109534

(51) Int. Cl.

*B60W 50/02* (2012.01)
*B60W 10/18* (2012.01)
*B60W 10/20* (2006.01)
*B60W 30/02* (2012.01)

(52) U.S. Cl.

CPC ...... *B60W 50/0225* (2013.01); *B60W 10/182* (2013.01); *B60W 10/20* (2013.01); *B60W 30/02* (2013.01); *B60W 50/0205* (2013.01); *B60W 2510/0657* (2013.01); *B60W 2510/202* (2013.01); *B60W 2540/10* (2013.01); *B60W 2540/12* (2013.01)

(58) Field of Classification Search

CPC ........... B60W 50/0225; B60W 10/184; B60W 10/20; B60W 30/02; B60W 50/0205; B60W 2510/0657; B60W 2510/202; B60W 2540/10; B60W 2540/12; B60W 30/045; B60W 30/18145; B60W 2540/18; B62D 5/003; B62D 9/005; B60Y 2306/13; B60Y 2400/84

USPC ........................................................... 701/41

See application file for complete search history.

(56) References Cited

U.S. PATENT DOCUMENTS

2023/0001929 A1 * 1/2023 Lapis .................... B60T 8/1755

* cited by examiner

*Primary Examiner* — Yi-Kai Wang

(74) *Attorney, Agent, or Firm* — NovoTechIP Internnational PLLC

(57) ABSTRACT

A method for controlling a vehicle including a steering-by-wire (SBW) system includes determining whether an abnormality has occurred in the SBW system; in response to determining an abnormality has occurred at the SBW system, operating a rear wheel steering system; applying a braking force to a first front wheel and a second front wheel disposed on a front side of the vehicle and applying a driving force to a first rear wheel and a second rear wheel disposed on the rear side of the vehicle; and in response to determining a turning radius of the vehicle by the rear wheel steering system does not satisfy a required turning radius input to a steering wheel, applying an additional braking force to the first front wheel and the second front wheel.

12 Claims, 7 Drawing Sheets

STEERING APPARATUS FOR VEHICLE AND CONTROL METHOD THEREFOR

CROSS-REFERENCE TO RELATED APPLICATIONS

The present application claims the benefit under 35 USC § 119(a) of Patent Application No. 10-2023-0109534, filed on Aug. 22, 2023 in Korea, the entire disclosure of which is incorporated herein by reference for all purposes.

TECHNICAL FIELD

The present disclosure relates to a steering apparatus for a vehicle and a control method therefor.

BACKGROUND

The content described in this section simply provides background information for the present disclosure and does not constitute related art.

A motor driven power system (MDPS) is a system that assists in steering of a vehicle using a motor. When an abnormality occurs in the MDPS, the vehicle loses a function of boosting a steering force using the motor, but fail-safe of the vehicle can be implemented by manipulating a steering wheel.

A steering-by-wire (SBW) system transfers driver's steering intention using an electrical signal without a mechanical connection between a steering wheel and wheels of a vehicle. The SBW system includes a road wheel actuator (RWA) which transfers the driver's steering intention to the wheels of the vehicle to drive the wheels, and a steering feedback actuator (SFA) which provides a reaction force of the steering wheel to the driver.

The SBW system has a problem that a steering function is lost when an abnormality such as a wire defect occurs. The RWA and SFA may be duplexed to implement steering redundancy and implement the fail-safe of the SBW system, but this causes an increase in manufacturing costs.

SUMMARY

A steering apparatus for a vehicle according to an embodiment can perform backup redundancy using a rear wheel steering system when an abnormality occurs in a steering-by-wire (SBW) system.

The steering apparatus for a vehicle according to an embodiment can assist in steering of a vehicle by applying a braking force and a driving force to part of a front wheel part and a rear wheel part.

The problems to be solved by the present disclosure are not limited to the problems mentioned above, and other problems not mentioned can be clearly understood by those skilled in the art from the description below.

A control method for a vehicle for steering based on a steering-by-wire (SBW) system, the control method for a vehicle comprising: determining whether an abnormality has occurred in the SBW system; in response to determining an abnormality has occurred in the SBW system, operating a rear wheel steering system; a first control step of applying a braking force to a first front wheel and a second front wheel disposed on a front side of the vehicle and applying a driving force to a first rear wheel and a second rear wheel disposed on the rear side of the vehicle; and in response to determining a turning radius of the vehicle due to the rear wheel steering system does not satisfy a required turning radius input to a steering wheel, a second control step of applying an additional braking force to the first front wheel and the second front wheel.

The operating of the rear wheel steering system includes steering the first rear wheel and the second rear wheel in a direction opposite to the turning direction of the vehicle; and aligning the first front wheel and the second front wheel in a straight alignment state.

The aligning of the first front wheel and the second front wheel in the straight alignment state includes aligning the first front wheels and the second front wheels in the straight alignment state when the alignment state of the first front wheels and the second front wheels is different from the turning direction of the vehicle.

The second control step includes applying a driving force to at least one of the first front wheel, the second front wheel, the first rear wheel, and the second rear wheel in order to follow a required speed of the vehicle.

The braking force applied to the first front wheel and the second front wheel are determined on the basis of a turning amount of the vehicle and a scrub radius of the first front wheel and the second front wheel.

The first control step includes applying a braking force to one of the first front wheel and the second front wheel located in the same direction as the turning direction of the vehicle so that the first front wheel and the second front wheel come to a straight alignment state, when the scrub radius has a positive value.

The first control step includes applying a braking force to one of the first front wheel and the second front wheel located in an opposite direction from the turning direction of the vehicle so that the first front wheel and the second front wheel come to a straight alignment state, when the scrub radius has a negative value.

The second control step includes applying an additional braking force to one of the first front wheel and the second front wheel located in the same direction as the turning direction of the vehicle to assist in steering of the vehicle, when the scrub radius has a positive value.

The second control step includes applying an additional braking force to one of the first front wheel and the second front wheel located in an opposite direction from the turning direction of the vehicle to assist in steering of the vehicle, when the scrub radius has a negative value.

The steering apparatus for a vehicle comprising: a sensor unit configured to detect a failure of the SBW system and detects steering information of the vehicle; a front wheel part including a first front wheel and a second front wheel of the vehicle; a rear wheel part including a first rear wheel and a second rear wheel of the vehicle; and a main controller configured to determine whether the SBW system fails and operate the rear wheel steering system on the basis of a result of the determination, wherein the main controller assists in steering of the vehicle by applying a braking force or driving force to the front wheel part and the rear wheel part.

The main controller steers the vehicle using at least one of a front wheel alignment state received from the sensor unit, the turning direction of the vehicle, and the scrub radius of the front wheel part.

The sensor unit includes at least one of an accelerator pedal sensor, a brake pedal sensor, a steering angle sensor, a steering torque sensor, and an engine torque sensor.

According to an embodiment, there is an effect that the steering apparatus for a vehicle can perform backup redundancy using a rear wheel steering system when an abnormality occurs in an SBW system.

According to an embodiment, there is an effect that the steering apparatus for a vehicle can assist in steering of a vehicle by applying a braking force and a driving force to part of a front wheel part and a rear wheel part.

DETAILED DESCRIPTION

Figure 1:
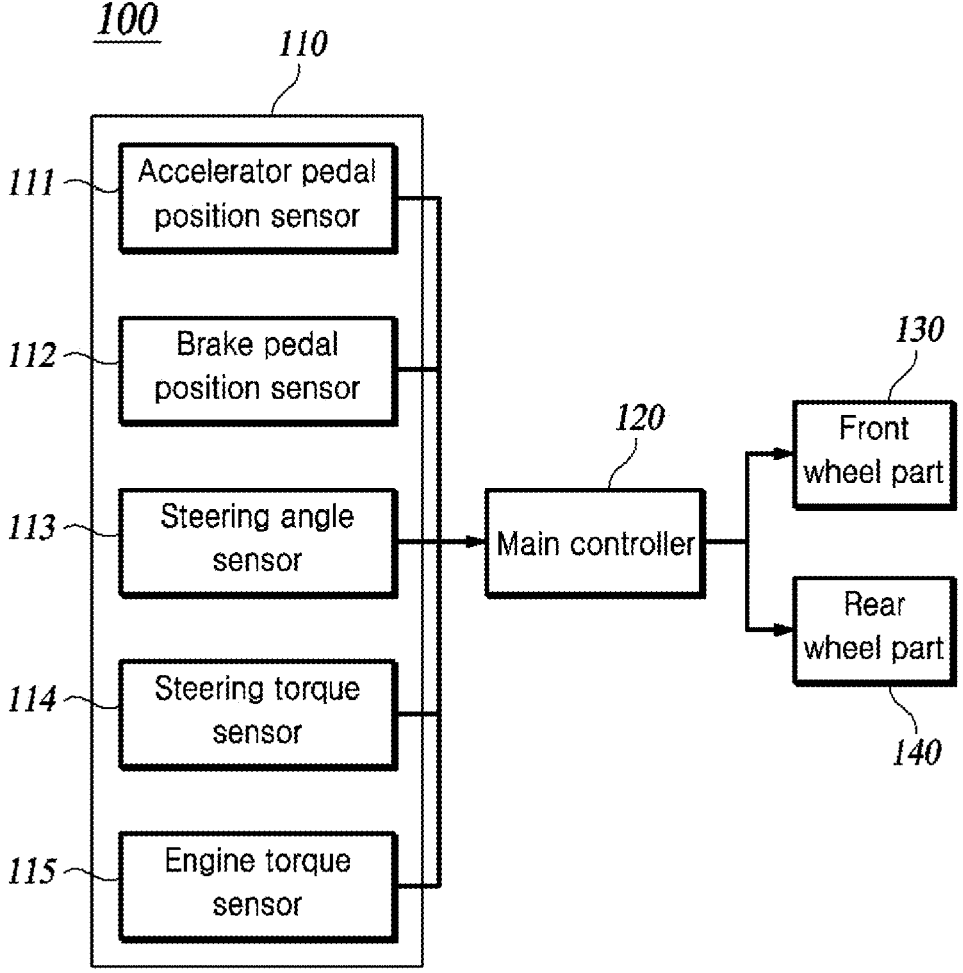
FIG. 1 is a schematic diagram illustrating a steering apparatus for a vehicle according to an embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit,' 'module,' and the like refer to one or more units for processing at least one function or operation, which may be implemented by hardware, software, or a combination thereof.

FIG. 1 is a schematic diagram illustrating a steering apparatus for a vehicle according to an embodiment of the present disclosure.

Referring to FIG. 1, the steering apparatus for a vehicle 100 includes a sensor unit 110, a main controller 120, a front wheel part 130, a rear wheel part 140, and/or the like.

The sensor unit includes an accelerator pedal position sensor 111, a brake pedal position sensor 112, a steering angle sensor 113, a steering torque sensor 114, an engine torque sensor 115, and/or the like.

The sensor unit 110 generates an output signal based on (or on the basis of) a detected value. The sensor unit 110 transmits the output signal to the main controller 120. Here, the signal output by the sensor unit 110 may be transmitted to the main controller 120 via an in-vehicle network (IVN).

The accelerator pedal position sensor 111 detects a position of an accelerator pedal when the driver steps on the accelerator pedal. The position of the pedal is converted into an electrical signal on the basis of a degree of stepping on the pedal. Here, the converted electrical signal may be an analog voltage or a digital signal.

The brake pedal position sensor 112 detects a stroke applied to the brake pedal by the driver.

The steering angle sensor 113 and the steering torque sensor 114 detect a steering angle and a steering torque input to the steering wheel 210. That is, the steering angle sensor 113 and the steering torque sensor 114 detect the driver's steering intention.

The engine torque sensor 115 detects a torque (rotating force) generated from an engine of the vehicle 200. The engine torque sensor 115 may be disposed on an output shaft of the engine or a transmission. When the engine operates, the engine torque sensor 115 may detect the engine torque in a case in which a rotational force is generated.

The main controller 120 includes a rear wheel steering system. However, the present disclosure is not limited thereto. The rear wheel steering system may be a separate controller from the main controller 120. When an abnormality occurs in a steering-by-wire (SBW) system, the rear wheel steering system may assist in steering the vehicle 200 by steering a rear wheel part 140.

The main controller 120 may be an electronic control unit. The main controller 120 may receive information on the vehicle 200 detected by the sensor unit 110.

According to an embodiment of the present invention, the steering apparatus for the vehicle 200 performs backup steering using a torque vectoring factor. Here, the torque vectoring factor includes an accelerator pedal position, a brake position, a steering angle, a steering torque, an engine torque, a braking torque for each wheel, a steering angle of a rear wheel, and/or the like.

The front wheel part 130 includes a first front wheel 220 and a second front wheel 221. The first front wheel 220 according to an embodiment of the present invention may be a left front wheel FL, and the second front wheel 221 may be a right front wheel FR. However, the present disclosure is not limited thereto. The first front wheel 220 and the second front wheel 221 change direction on the basis of the driver's steering intention input to the steering wheel 210.

The rear wheel part 140 includes a first rear wheel 230 and a second rear wheel 231. The first rear wheel 230 according to an embodiment of the present invention may be a left rear wheel RL, and the second rear wheel 231 may be ae right rear wheel RR. However, the present disclosure is not limited thereto.

When an abnormality occurs in the SBW system, the first rear wheel 230 and the second rear wheel 231 according to an embodiment of the present invention may change the direction by a predetermined angle on the basis of the rear wheel steering system. Here, the rear wheel steering system may be a rear wheel steering system. The rear wheel steering system can detect a movement of the turning vehicle 200 in real time. The rear wheel steering system may implement turning performance of the vehicle 200 by integrating and controlling braking control of an electronic stability control system (ESC) and the rear wheel steering system.

Figure 2:
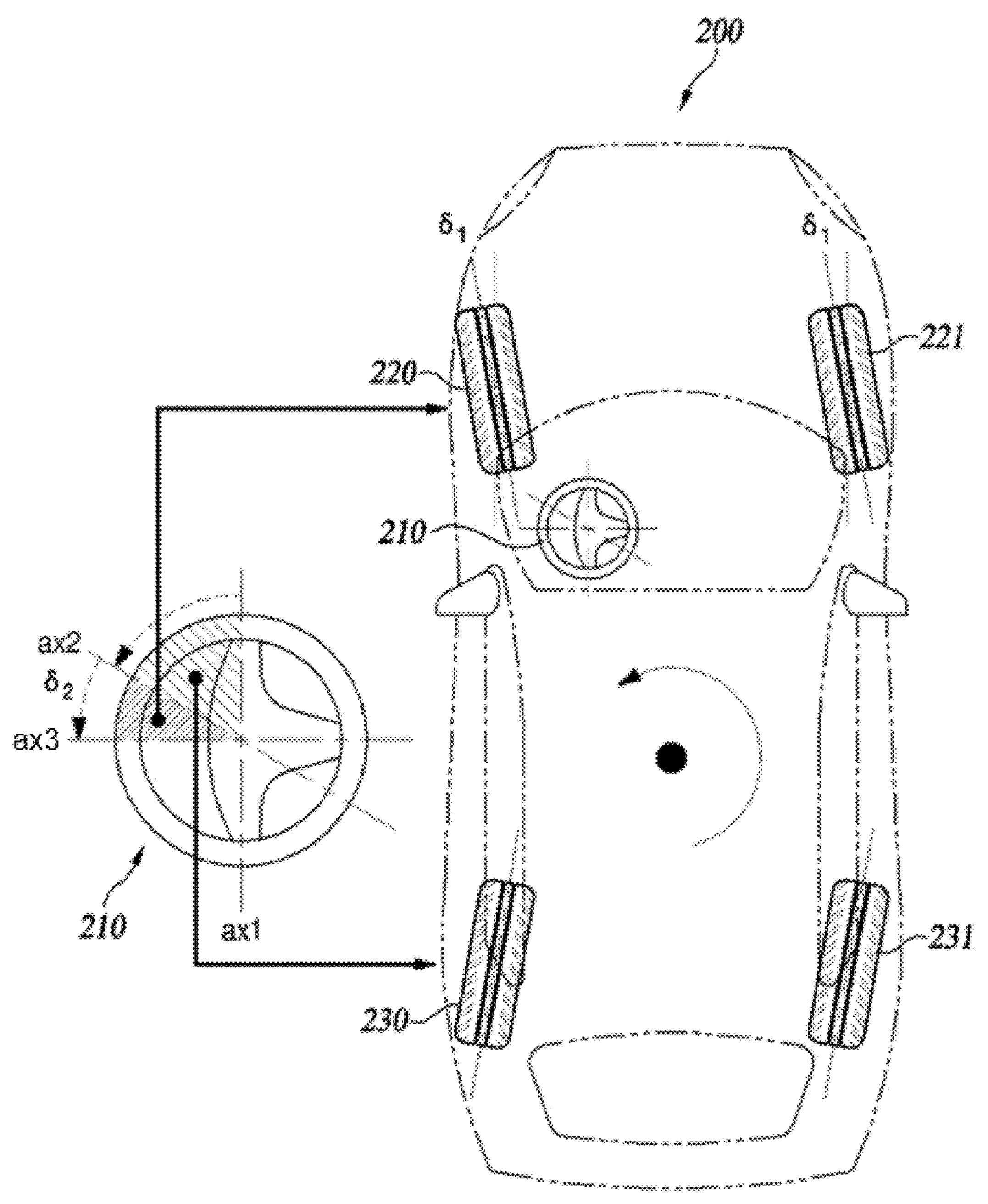
FIG. 2 is a diagram illustrating a first control process and a second control process of the steering apparatus for a vehicle according to an embodiment of the present disclosure.

FIG. 2 is a diagram illustrating a first control process and a second control process of the steering apparatus for a vehicle according to an embodiment of the present disclosure.

Referring to FIGS. 1 and 2, when a determination is made that an abnormality has occurred in the SBW system, the steering apparatus for a vehicle 100 according to an embodiment of the present invention may operate the rear wheel steering system to steer the first rear wheel 230 and the second rear wheel 231. Here, the first rear wheel 230 and the second rear wheel 231 may be rotated to follow the driver's steering intention applied to the steering wheel 210.

In FIG. 2, the driver's steering intention applied to the steering wheel 210 is illustrated in a left turning direction, but this is only an example and is not limited thereto.

The first rear wheel 230 and the second rear wheel 231 steered on the basis of the rear wheel steering system may follow the steering angle from ax1 to ax2 with reference to the steering wheel 210. Here, ax1 refers to a vertical axis on the steering wheel 210 when the steering wheel 210 is located at a home position. ax2 refers to an axis rotated with reference to ax1 of the steering wheel 210 when the first rear wheel 230 and the second rear wheel 231 compensate for the steering angle required for the steering wheel 210 on the basis of the rear wheel steering system.

When the driver requests a steering angle exceeding ax2 on the steering wheel 210, the steering apparatus for a vehicle 200 according to an embodiment of the present invention applies a one-way braking force to any one of the first front wheel 220 and the second front wheel 221 to assist in steering the vehicle 200. The one-way braking force applied to any one of the first front wheel 220 and the second front wheel 221, for example, may follow the steering of the vehicle 200 by a rotation angle from ax2 to ax3 with reference to the steering wheel 210. Here, ax3 is refers to an axis rotated with reference to ax2 of the steering wheel 210 when the steering angle required for the steering wheel 210 is compensated for on the basis of the one-way braking force applied to any one of the first front wheel 220 and the second front wheel 221. The first front wheel 220 and the second front wheel 221 are rotated by a steering angle 81 due to the one-way braking force, and a steering angle 82 of the steering wheel 210 is an angle corresponding to the steering angle 81 of the first front wheel 220 and the second front wheel 221.

Figure 3:
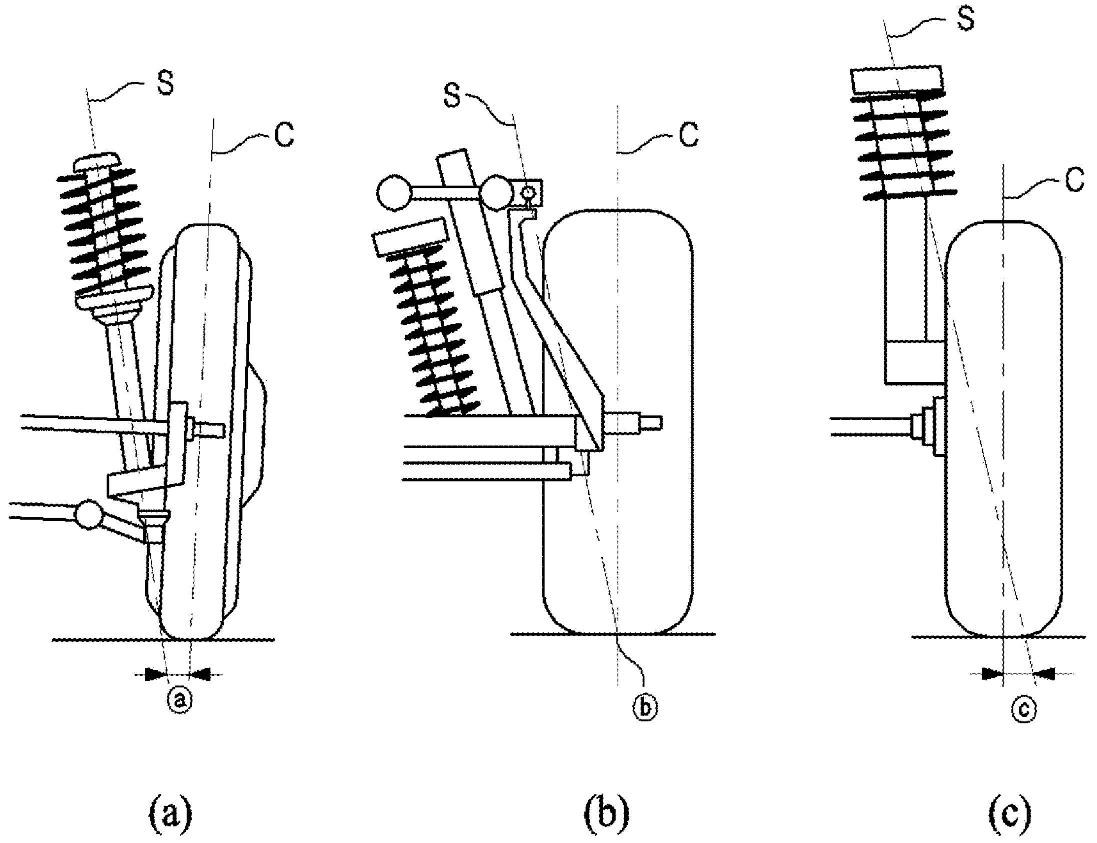
FIG. 3 is a diagram illustrating a scrub radius according to an embodiment of the present disclosure.

FIG. 3 is a diagram illustrating a scrub radius according to an embodiment of the present disclosure.

Referring to FIG. 3, when an abnormality occurs in the SBW system, the main controller 120 detects a steering angle of the steering wheel 210. On the basis of the detected steering angle of the steering wheel 210, the main controller 120 operates the rear wheel steering system to turn the vehicle 200. Here, a turning direction of the vehicle 200 may be a left or rightward direction.

When the vehicle 200 turns, the main controller 120 prevents a rotation direction of the front wheel part 130 from being steered in a direction different from the turning direction of the vehicle 200. The rotation direction of the front wheel part 130 being steered in the direction different from the turning direction means that rotation directions of the rear wheel part 140 and the front wheel part 130 steered on the basis of the rear wheel steering system are steered in the same direction. For example, when the vehicle 200 turns in the rightward direction, the rear wheel steering system steers the rear wheel part 140 in the leftward direction. Here, the direction of the front wheel part 130 is steered in the rightward direction on the basis of the turning direction, but may be rotated in the leftward direction that is an opposite direction due to a scrub radius effect.

The scrub radius represents a distance between a point at which the extension of a steering axis S in FIG. 3 meets the ground and a contact center point C of a tire. When this distance is on the inner side of the vehicle 200 from a tire center line C, the scrub radius means a positive value (+) ⓐ, and when this distance is outside the tire center line C, the scrub radius means a negative value (−) ⓒ. When the extension of the steering axis S and the tire center line C intersect on the ground, the scrub radius is 0 (zero) ⓑ.

(a) of FIG. 3 illustrates a case in which a scrub radius value is a positive value (+) ⓐ. (b) of FIG. 3 illustrates a case in which the scrub radius value is 0 (zero) ⓑ. (c) of FIG. 3 illustrates a case in which the scrub radius value is a negative value (−) ⓒ. This scrub radius value is determined by the performance, specification, and purpose of each vehicle 200.

As illustrated in (a) of FIG. 3, the positive scrub radius ⓐ is mainly used in a front engine rear drive (FR) vehicle 200. In a case in which the scrub radius is set on the inner side from the tire center line C, the front wheel changes a direction while rotating when the steering wheel 210 is steered, which provides an advantage that an operation of the steering wheel 210 becomes lighter. However, when the positive scrub radius ⓐ is too large, not only the risk of shock generated on a road surface being transmitted to the steering wheel 210 and destroying a steering gearbox increase, but also driver's fatigue increases and causes difficulty in driving.

The scrub radius ⓑ illustrated in (b) of FIG. 3 is a place at which a point at which the extension of the steering axis S intersects the ground matches the contact center of the tire. That is, the vehicle 200 has no scrub radius. In a case in which the scrub radius is, for example, 0, the vehicle 200 tries to change the direction instead of the front wheels rotating when the steering wheel 210 is steered to move the front wheels left and right, unlike the positive scrub radius ⓐ. Therefore, an operation of the steering wheel 210 becomes heavier, but shock on the road surface becomes smaller. Therefore, the scrub radius ⓑ may be used in combination with a power steering apparatus.

In a negative scrub radius ⓒ illustrated in (c) of FIG. 3, the point at which the extension line of the steering axis S intersects with the ground is located outside the vehicle 200 relative to a center of the contact point of the front tire. This is as if a strut of the front wheel is mounted on the outside of the front wheel, not on the inside. Therefore, when there is a difference in braking force between the left front wheel and the right front wheel, the wheel is always directed to the inner side in proportion to the braking force of the front wheel due to a rotational force around the strut mounted on the outer side of the front wheel, and thus, the straightness of the vehicle 200 is maintained and stability is secured.

Figure 4:
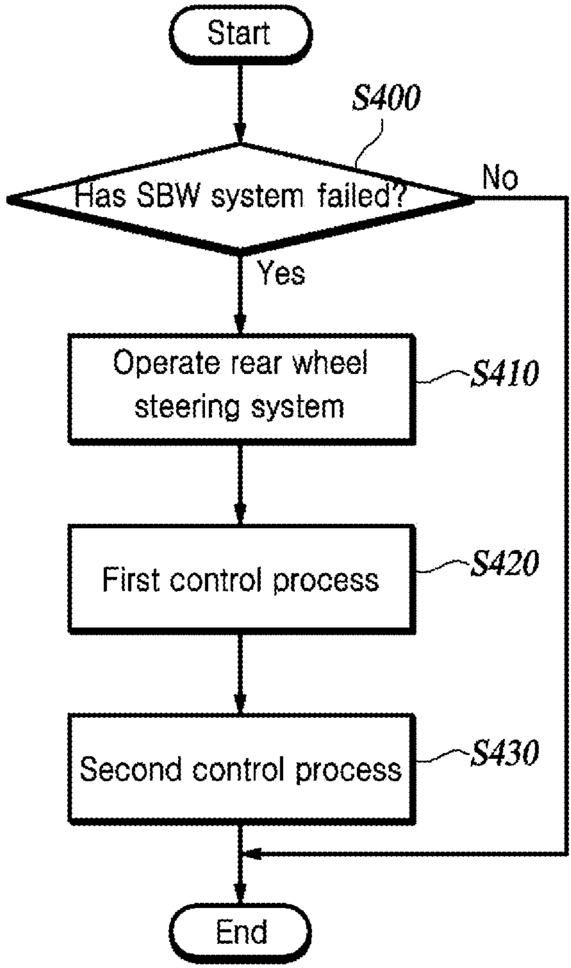
FIG. 4 is a flowchart illustrating a control method for a vehicle according to an embodiment of the present disclosure.

FIG. 4 is a flowchart illustrating a control method for a vehicle according to an embodiment of the present disclosure.

Referring to FIG. 4, a determination is made as to whether an abnormality has occurred in the SBW system (S400). The main controller 120 may use the sensor unit 110 to monitor whether the first front wheel 220 and the second front wheel 221 are aligned in a direction opposite to the turning direction of the vehicle 200.

When a determination is made in step S400 that an abnormality has occurred in the SBW system, the rear wheel steering system is operated (S410). The main controller 120 determines that an abnormality has occurred in the SBW system. On the basis of a result of the determination, the main controller 120 may operate the rear wheel steering system.

The first control process is performed (S420). The first control process includes a process in which, when the rear wheel steering system is operated, the same front wheel braking force is applied to both the first front wheel 220 and the second front wheel 221 to align the first front wheel 220 and the second front wheel 221 in a straight alignment state.

The second control process is performed (S430). The second control process includes a process in which, when the turning radius of the vehicle 200 by the rear wheel steering system does not satisfy the required turning radius input to the steering wheel 210, the main controller 120 applies an additional braking force to the first front wheel 220 and the second front wheel 221.

Figure 5:
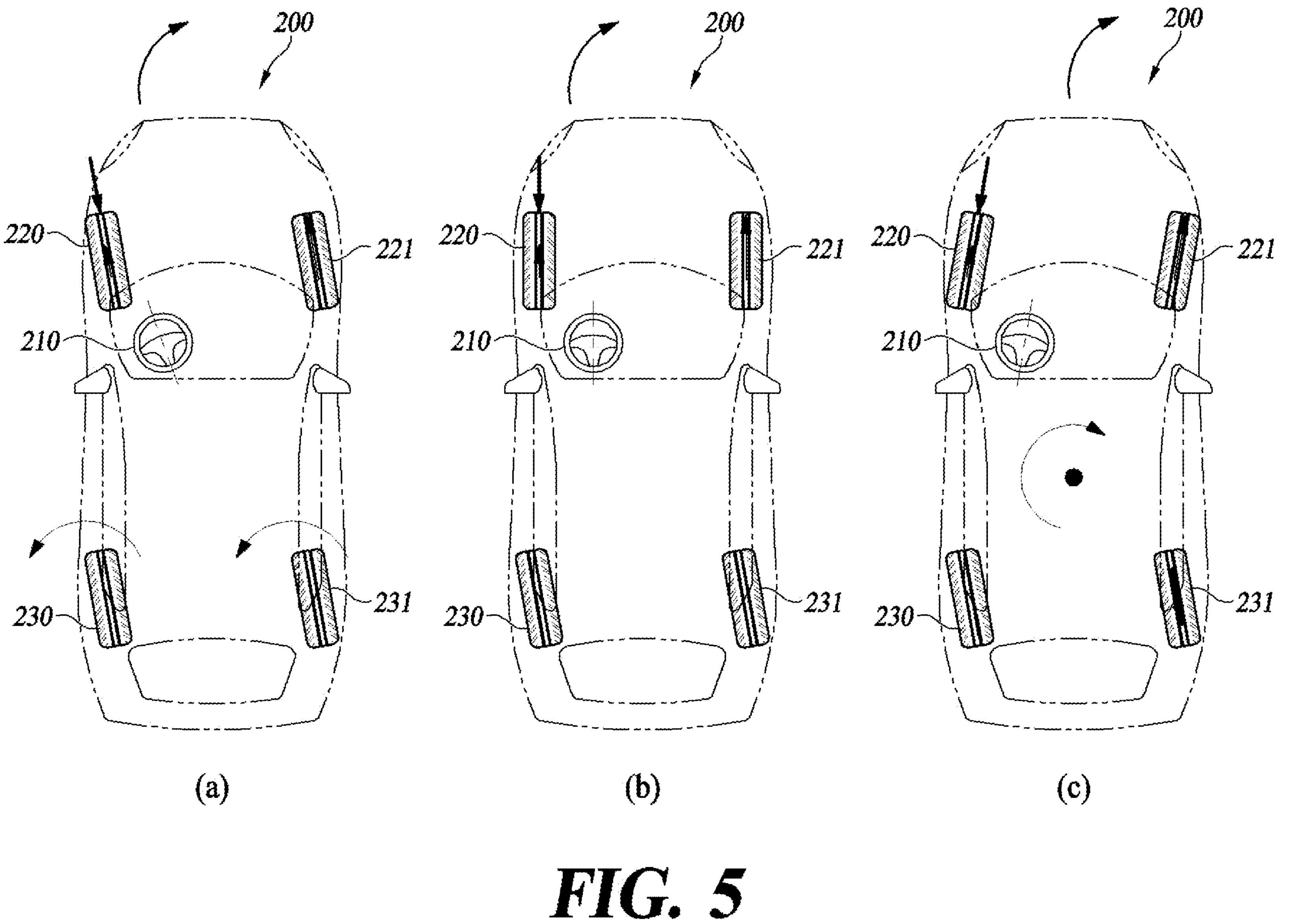
FIG. 5 is a schematic diagram of an operating state of the steering apparatus for a vehicle when a vehicle turns in a rightward direction and front and rear wheel parts of the vehicle are in the same alignment state according to an embodiment of the present disclosure.

FIG. 5 is a schematic diagram of an operating state of the steering apparatus for a vehicle when the vehicle turns in the rightward direction and the front and rear wheel parts of the vehicle are in the same alignment state according to an embodiment of the present disclosure.

Referring to FIGS. 3 and (a) of FIG. 5, when the turning direction of the vehicle 200 is to the right and the scrub radius has a negative value, the main controller 120 rotates the first rear wheel 230 and the second rear wheel 231 to assist in steering of the vehicle 200 on the basis of the rear wheel steering system in a case in which an abnormality occurs in the SBW system. Here, since the disposition sate of the front wheel part 130 is the same as that of the rear wheel part 140, the main controller 120 applies a braking force to the first front wheel 220 in order to rotate the front wheel part 130 so that the alignment state comes to the straight alignment state.

However, the present disclosure is not limited thereto. When the rear wheel steering system operates, the front wheel part 130 may be in a different alignment state from the rear wheel part or may be in the straight alignment state. Here, in a control apparatus for the vehicle 200 according to another embodiment of the present invention), the main controller 120 may apply a braking force to the second front wheel 221 to rotate the front wheel part 130 so that the front wheel part 130 comes to the straight alignment state when the scrub radius has a positive value.

Referring to (b) of FIG. 5, the main controller 120 rotates the first rear wheel 230 and the second rear wheel 231 to follow the turning direction of the vehicle 200, and then applies differential driving forces to the first front wheel 220 and the second front wheel 221 that are in the straight alignment state. The driving force applied to the second front wheel 221 adjacent to the turning direction of the vehicle 200 is greater than the driving force applied to the first front wheel 220.

Referring to (c) of FIG. 5, in order to apply a greater driving force to the second front wheel 221 than the first front wheel 220 to induce steering in the vehicle 200, and then generate a larger rotation moment in the vehicle 200, the main controller 120 may apply the braking force to the first front wheel 220 and the second rear wheel 231. Here, when the scrub radius of the control apparatus for the vehicle 200 according to another embodiment of the present invention has a positive value, the braking force is applied to the second front wheel 221 and the second rear wheel 231 so that a larger rotation moment can be generated in the vehicle 200.

Figure 6:
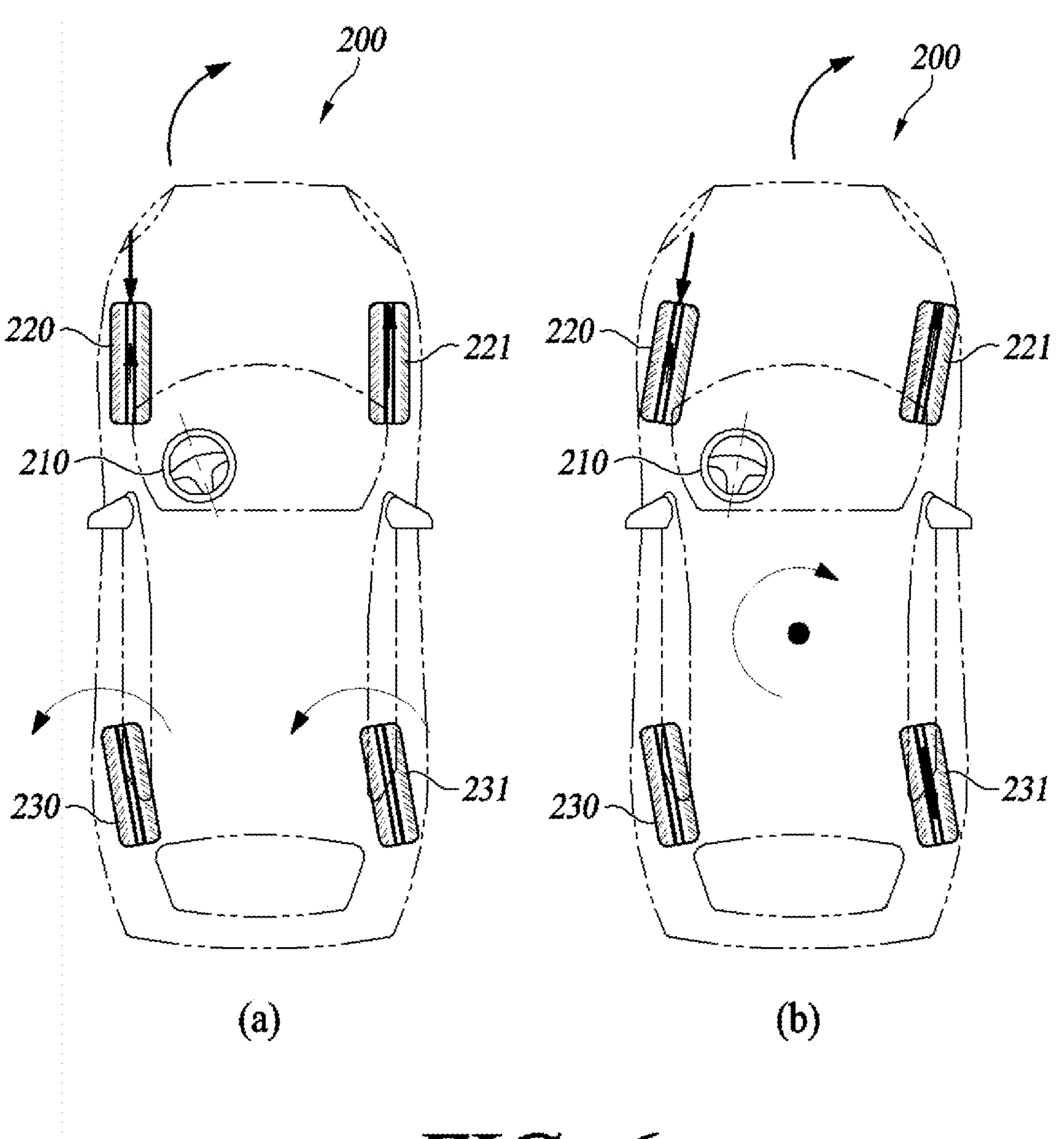
FIG. 6 is a schematic diagram illustrating an operating state of the steering apparatus for a vehicle when the vehicle turns in the rightward direction and a front wheel part of the vehicle is in a straight alignment state according to an embodiment of the present disclosure.

FIG. 6 is a schematic diagram illustrating an operating state of the steering apparatus for a vehicle when the vehicle turns in the rightward direction and the front wheel part of the vehicle is in the straight alignment state according to an embodiment of the present disclosure.

Referring to FIG. 3, (a) of FIG. 6, and (b) of FIG. 6, in a case in which the turning direction of the vehicle 200 is a rightward direction and the scrub radius has a negative value, the main controller 120 induces steering of the vehicle 200 by rotating the first rear wheel 230 and the second rear wheel 231 on the basis of the rear wheel steering system when an abnormality occurs in the SBW system. Here, in order to assist in steering of the vehicle 200, the main controller 120 may apply a braking force to a portion of the front wheel part 130 to generate a rotation moment of the vehicle 200. For example, the main controller 120 may apply a braking force to the first front wheel 220 located on the opposite side of the turning direction of the vehicle 200 to generate a rotation moment that causes the vehicle 200 to rotate to the right. When the scrub radius of the front wheel part 130 has a negative value, the main controller 120 generates a one-way braking force in the first front wheel 220 of the front wheel part 130 in order to prevent a phenomenon that the front wheel part 130 tries to rotate in phase with the rotated rear wheel part 140. Here, in order to increase the rotation moment of the vehicle 200, the main controller 120 may apply a braking force to the second rear wheel 231. Although not illustrated in FIG. 6, when the scrub radius has a positive value, the main controller 120 generates a one-way braking force in the second front wheel 221 of the front wheel part 130 to align the front wheel part 130 and increase the rotation moment of the vehicle 200.

Although not illustrated in FIG. 6, when the turning direction of the vehicle 200 is a leftward direction and the scrub radius has a negative value, the first rear wheel 230 and the second rear wheel 231 are rotated to the rightward direction that is opposite to the turning direction on the basis of the rear wheel steering system. Here, in order to increase the rotation moment of the vehicle, the main controller 120 may generate a one-way braking force in the second front wheel 221. On the other hand, when the turning direction of the vehicle 200 is a leftward direction and the scrub radius has a positive value, the main controller 120 may generate a one-way braking force in the first front wheel 220 to increase the rotation moment of the vehicle.

Figure 7:
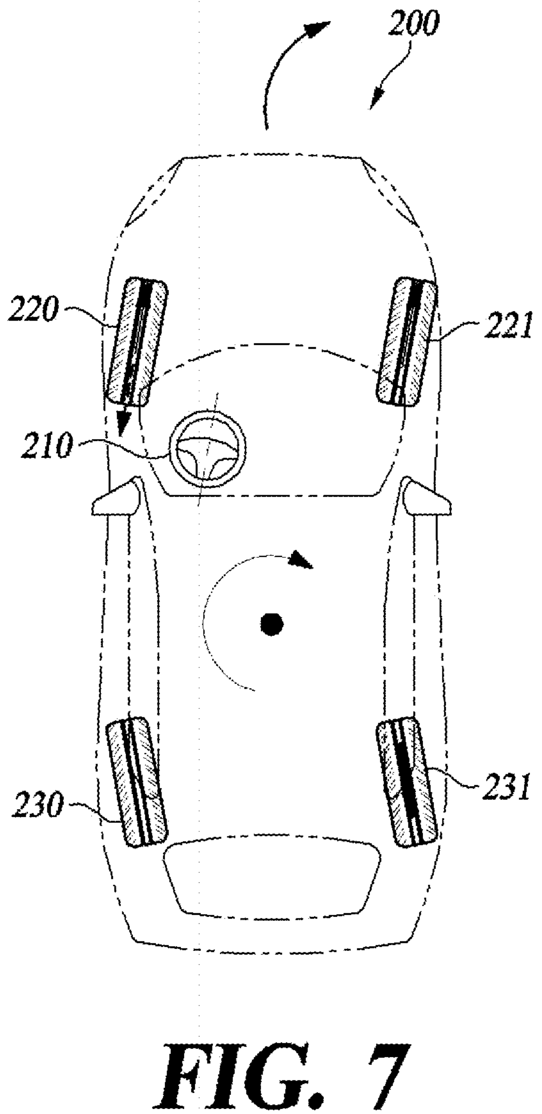
FIG. 7 is a schematic diagram illustrating an operating state of the steering apparatus for a vehicle when alignment states of the front and rear wheel parts of the vehicle are different from each other when the vehicle turns in the rightward direction according to an embodiment of the present disclosure.

FIG. 7 is a schematic diagram illustrating an operating state of the steering apparatus for a vehicle when the alignment states of the front and rear wheel parts of the vehicle are different from each other when the vehicle turns in the rightward direction according to an embodiment of the present disclosure.

Referring to FIGS. 3 and 7, when the scrub radius has a negative value and the vehicle 200 turns in the rightward direction on the basis of the rear wheel steering system, a braking force can be applied to the second rear wheel 231 disposed in the same direction as the rotation direction of the vehicle 200 in order to generate a rotation moment of the vehicle 200 in a case in which the alignment states of the front wheel part 130 and the rear wheel part 140 are different from each other during traveling of the vehicle 200. Further, the main controller 120 may apply a braking force to the first front wheel 220 to prevent a phenomenon that the front wheel part 130 tries to rotate in a direction opposite to a direction in which the front wheel part 130 wants to rotate due to the scrub radius effect occurring in the front wheel part 130. In another embodiment of the present invention, when the scrub radius has a positive value and when the scrub radius has a negative value, a braking force may be applied to the second front wheel 221 to prevent the scrub radius effect.

In another embodiment of the present invention, when the scrub radius has a negative value and the vehicle 200 turns in the leftward direction on the basis of the rear wheel steering system, for example, a braking force may be applied to the second front wheel 221 in order to rotate the front wheel part 130 so that the front wheel part 130 comes to the straight alignment state in a case in which the alignment states of the front wheel part 130 and the rear wheel part 140 are in phase during travelling of the vehicle 200. Here, when the scrub radius has a positive value, a braking force may be applied to the first front wheel 220 to rotate the front wheel part 130 so that the front wheel part 130 comes to the straight alignment state. An additional braking force may be applied to the first front wheel 220 rotated in the straight alignment state in order to generate a rotation moment of the vehicle.

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general-purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a random-access memory (RAM), a compact disc ROM (CD-ROM), magnetic tape, a floppy disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Although operations are illustrated in the flowcharts/timing charts in this specification as being sequentially performed, this is merely an exemplary description of the technical idea of one embodiment of the present disclosure. In other words, those skilled in the art to which one embodiment of the present disclosure belongs may appreciate that various modifications and changes can be made without departing from essential features of an embodiment of the present disclosure, that is, the sequence illustrated in the flowcharts/timing charts can be changed and one or more operations of the operations can be performed in parallel. Thus, flowcharts/timing charts are not limited to the temporal order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A method for controlling a vehicle including a steering-by-wire (SBW) system, comprising:

determining whether an abnormality has occurred at the SBW system;

in response to determining that an abnormality has occurred at the SBW system, operating a rear wheel steering system;

applying a braking force to first and second front wheels of the vehicle and applying a driving force to first and second rear wheels of the vehicle; and in response to determining that a turning radius of the vehicle by the rear wheel steering system does not satisfy a required turning radius input to a steering wheel of the vehicle, applying an additional braking force to the first and second front wheels.

2. The method of claim 1, wherein operating the rear wheel steering system includes:

steering the first and second rear wheels in a direction opposite to a turning direction of the vehicle; and aligning the first and second front wheels in a straight alignment state.

3. The method of claim 2, wherein aligning the first and second front wheels in the straight alignment state includes aligning the first and second front wheels in the straight alignment state when an alignment state of the first and second front wheels is different from the turning direction of the vehicle.

4. The method of claim 1, wherein applying the additional braking force to the first and second front wheels of the vehicle includes applying a driving force to at least one of the first front wheel, second front wheel, first rear wheel and second rear wheel in order to follow a required speed of the vehicle.

5. The method of claim 1, wherein the braking force applied to the first and second front wheels is determined based on a turning amount of the vehicle and a scrub radius of the first and second front wheels.

6. The method of claim 5, wherein applying the braking force to the first and second front wheels of the vehicle includes, in response to the scrub radius of the first and second front wheels having a positive value, applying the braking force to one of the first and second front wheels located in a same direction as a turning direction of the vehicle so that the first and second front wheels come to a straight alignment state.

7. The method of claim 5, wherein applying the braking force to the first and second front wheels of the vehicle includes, in response to the scrub radius of the first and second front wheels having a negative value, applying the braking force to one of the first and second front wheels located in a direction opposite to a turning direction of the vehicle so that the first and second front wheels come to a straight alignment state.

8. The method of claim 5, wherein applying the additional braking force to the first and second front wheels of the vehicle includes, in response to the scrub radius of the first and second front wheels having a positive value, applying the additional braking force to one of the first and second front wheels located in a same direction as a turning direction of the vehicle to assist steering of the vehicle.

9. The method of claim 5, wherein applying the additional braking force to the first and second front wheels of the vehicle includes, in response to the scrub radius of the first and second front wheels having a negative value, applying the additional braking force to one of the first and second front wheels located in a direction opposite to a turning direction of the vehicle to assist steering of the vehicle.

10. An apparatus for controlling a vehicle including a steering-by-wire (SBW) system, comprising:

a sensor unit configured to detect (1) a failure of the SBW system and (2) steering information of the vehicle;

a front wheel part including first and second front wheels of the vehicle;

a rear wheel part including first and second rear wheels of the vehicle; and a main controller configured to assist steering of the vehicle by applying a braking or driving force to the front or rear wheel part, wherein the main controller is configured to:

determine whether an abnormality has occurred at the SBW system;

in response to determining that an abnormality has occurred at the SBW system, operate the rear wheel part;

apply a braking force to the first and second front wheels and apply the driving force to the first and second rear wheels; and in response to determining that a turning radius of the vehicle by the rear wheel part does not satisfy a required turning radius input to a steering wheel of the vehicle, apply an additional braking force to the first and second front wheels.

11. The apparatus of claim 10, wherein the main controller is configured to control the vehicle to steer based on at least one of a front wheel alignment state received from the sensor unit, a turning direction of the vehicle, and a scrub radius of the front wheel part.

12. The apparatus of claim 10, wherein the sensor unit includes at least one of an accelerator pedal sensor, a brake pedal sensor, a steering angle sensor, a steering torque sensor, and an engine torque sensor.

* * * * *